United States Patent [19]

Lalikos

[11] Patent Number: 4,653,780
[45] Date of Patent: Mar. 31, 1987

[54] SELF-ALIGNING TUBE FITTING

[75] Inventor: James M. Lalikos, Springfield, Mass.

[73] Assignee: Titeflex Corporation, Springfield, Mass.

[21] Appl. No.: 538,098

[22] Filed: Oct. 3, 1983

[51] Int. Cl.$^4$ .............................................. F16L 27/00
[52] U.S. Cl. ..................................... 285/276; 285/388; 285/305; 277/169
[58] Field of Search .............. 285/276, 388, 387, 321, 285/305, 354, DIG. 18; 277/167.5, 217, 168, 169, 170, 171

[56] References Cited

U.S. PATENT DOCUMENTS

| | | | |
|---|---|---|---|
| 2,253,018 | 8/1941 | Cowles | 285/276 |
| 3,142,498 | 7/1964 | Press | 285/DIG. 18 |
| 3,672,704 | 6/1972 | Christianson | 285/110 |
| 3,973,791 | 8/1976 | Porta et al. | 285/305 |
| 4,186,946 | 2/1980 | Snow | 285/305 |
| 4,262,941 | 4/1981 | Lalikos et al. | 285/110 |
| 4,435,005 | 3/1984 | Berger et al. | 285/388 |

FOREIGN PATENT DOCUMENTS

| | | | |
|---|---|---|---|
| 115529 | 7/1942 | Australia . | |
| 0271112 | 5/1969 | Austria | 285/305 |
| 911263 | 7/1946 | France | 285/256 |
| 0977603 | 4/1951 | France | 285/321 |

Primary Examiner—Richard J. Scanlan, Jr.
Assistant Examiner—Eric K. Nicholson
Attorney, Agent, or Firm—Louis Bernat

[57] ABSTRACT

An end fitting provides a coupling for a pair of parts which may be misaligned. One of the possibly misaligned parts is a nut having a bore therein. The other part is a ferrule fitting in the bore and, preferably having a lip seal thereon. A pair of confronting annular U-shaped slots are formed in the two parts, with a pin wire ring resting in the slots in order to join the two parts. The cross-sections of the two U-shaped slots are skewed with respect to a perpendicular to the bore, by an angle in the range of 6-degrees to 45-degrees, with the preferred angle being 15-degrees. The pin wire ring rides up and down the resulting tapered walls of the slots to compensate for any misalignment.

10 Claims, 5 Drawing Figures

SELF-ALIGNING TUBE FITTING

This invention relates to pressure resistant fittings for tubular structures, and more particularly, although not exclusively, to end fittings for hoses, especially for use as hoses for high performance aircraft fuel, lubrication, hydraulic, and similar systems. The terms "fluid line" or "fluid hose" are used hereinafter to include all of these and similar applications.

It should be noted that the inventive fitting is required to insure against leakage under extremely hostile environmental conditions. For example, an aircraft might encounter many "G's" at extremely high altitudes where external atmospheric pressure is greatly reduced. There could also be a leakage caused by misaligned fittings, which could not have been detected prior to flight or which appears only during use.

This invention adds further improvements and enables an easy use of a gas tight fitting shown in U.S. Pat. Nos. 3,672,704, and 4,262,941. U.S. Pat. No. 3,672,704 (Roger D. Christianson, inventor) entitled "LIP-SEAL FITTING", issued June 27, 1972. This form of hose fitting has an internal flange in the form of a Belleville spring. In cross section, the flange has a toe and a heel with a spring arched therebetween. When threaded couplers are tightened, the flange arch tends to compress with the tension of the Belleville spring causing an augmented pressure in two concentric sealing areas.

This patented seal is very efficient and tends to become tighter as the internal hose pressure increases. However, some care is required when the parts of the fitting are joined, in order to insure proper axial alignment. If a mechanic installing a hose should fail to seat the arched spring flange carefully, the fitting might leak. Sometimes, the misalignment might occur as a result of causes beyond the mechanic's control, such as spring back, manufacturing tolerances, vibrations, or the like.

U.S. Pat. No. 4,262,941 (Lalikos and Lefebvre, inventors) entitled "SELF-ALIGNING TUBE FITTING", issued Apr. 21, 1981, shows a method of aligning the threaded parts of the lip seal fittings, even when the parts do not align perfectly. The self-aligning capabilities of this patent work quite well for most uses. However, there are times when and places where other forms of self-aligning fittings might be more appropriate. This invention is designed to meet those needs.

Accordingly, an object of the invention is to provide new and improved, flanged hose fittings which are more tolerant of misalignments. Here, an object is to provide fittings which may be used by less skilled mechanics.

Another object of the invention is to provide a safer aircraft fluid line by reducing the chances for leakage under extremely hostile conditions.

Still another object of the invention is to adapt the fitting of U.S. Pat. No. 3,672,704 to more widespread usage.

A preferred embodiment of the invention is seen in the attached drawings, wherein.

Figures 1, 2, 3:
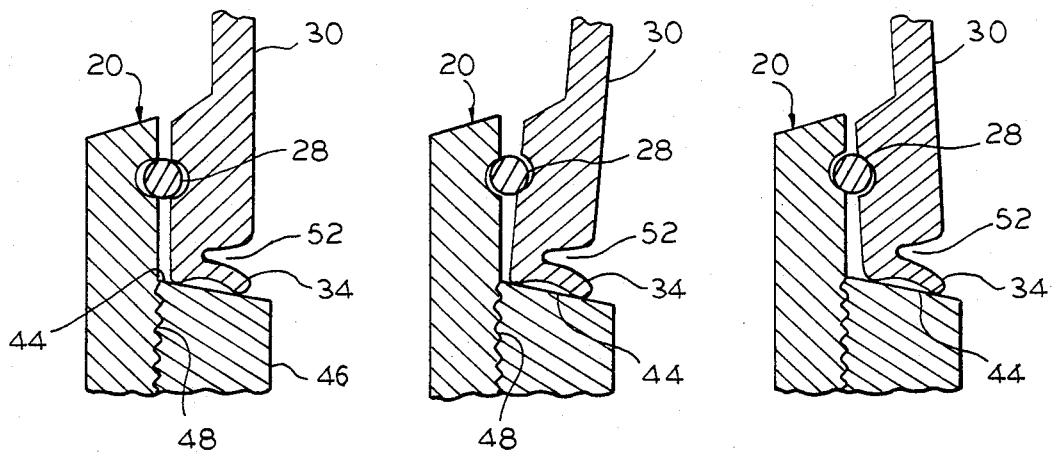
FIGS. 1-3 are cross-sectional views which illustrate how misalignment of the lip seal fittings is tolerated by the inventive design.

Ideally, all parts are axially aligned when the nut 20 is tightened to force the end of a sleeve or ferrule 30 onto the nipple 46, as seen in FIG. 1. Therefore, the flange 34 on ferrule 30 is seated perfectly upon the seat 44. However, it is also possible that the parts do not form such a perfect axial seal because there is a poor alignment. There could be a shifting of parts because they tend to spring back to a minimum energy position while the nut 20 is being tightened. Or parts could shift due to age or vibration or because manufacturing tolerances placed one part in an extreme right-hand position and another part in an extreme left-hand position. Of course, there could also be a combination of these and many other reasons for misalignment of the fitting parts.

In FIG. 2, the misalignment is shown with the flange 34 shifted to the left, and in FIG. 3, it is shifted to the right. In U.S. Pat. No. 4,262,941, there are shoulders on the nut and ferrule which function as a swivel joint and which maintain a metal-to-metal seal. In the subject invention, a pin wire ring 28 forms the metal-to-metal seal. The tension in the Belleville spring formed by the arch of flange 34 holds the two concentric sealing circles, at the toe and the heel of the flange 34, in firm contact with the seat 44. The spring tension is substantially the same in each of the FIGS. 1-3. Therefore, the inventive fitting can tolerate a substantial misalignment.

Before the invention shown and described in U.S. Pat. No. 3,672,704, the fittings did not have an arch in the flange 34, but had a flat surface. When such a fitting is misaligned, the entire flange surface must lie flat, in face-to-face contact across the width of seat 44. This requirement for a broad face-to-face contact is much more likely to damage the neck area 52 which joins flange 34 to sleeve 30. Therefore, this older type of fitting, with a flat flange, has tended to require an even better alignment to keep the parts closer together to reduce the leverage that damages the neck 52. That close association makes a stiffer part and causes the flange to rub on the sealing surface during a tightening of the fitting.

To provide an alternative means for and method of joining a poorly aligned fitting, the invention uses a nut having a bore formed therein with a ferrule passing through the bore. The nut and ferrule are joined by a pin wire.

Figure 4:
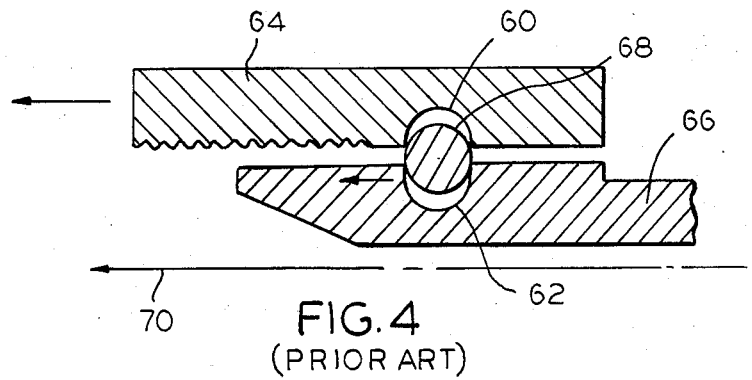
FIG. 4 shows a prior art fitting using a pin wired nut.

In such a combination using a pin wire, the prior art (FIG. 4) has provided confronting annular grooves or slots 60, 62, each having a U-shaped cross-section. These grooves are formed on the inside surface of a nut 64 and an outside surface on a ferrule 66. A pin-wire ring 68 has been placed in these annular slots to join together the two parts. As the nut 64 is tightened, there is a lateral transfer of forces from the walls of slot 60 in nut 64, through the pin wire ring 68 to the walls of groove or slot 62 in ferrule 66, as is indicated by two small arrows pointing to the left (FIG. 4), in the wire 68 and the ferrule 66. These forces are always parallel to the center line 70 of the fitting. Therefore, these devices are not very tolerant of misalignment. When the misalignment between nut and ferrule exceeds some limit, this conventional pin wire approach will no longer work.

Figure 5:
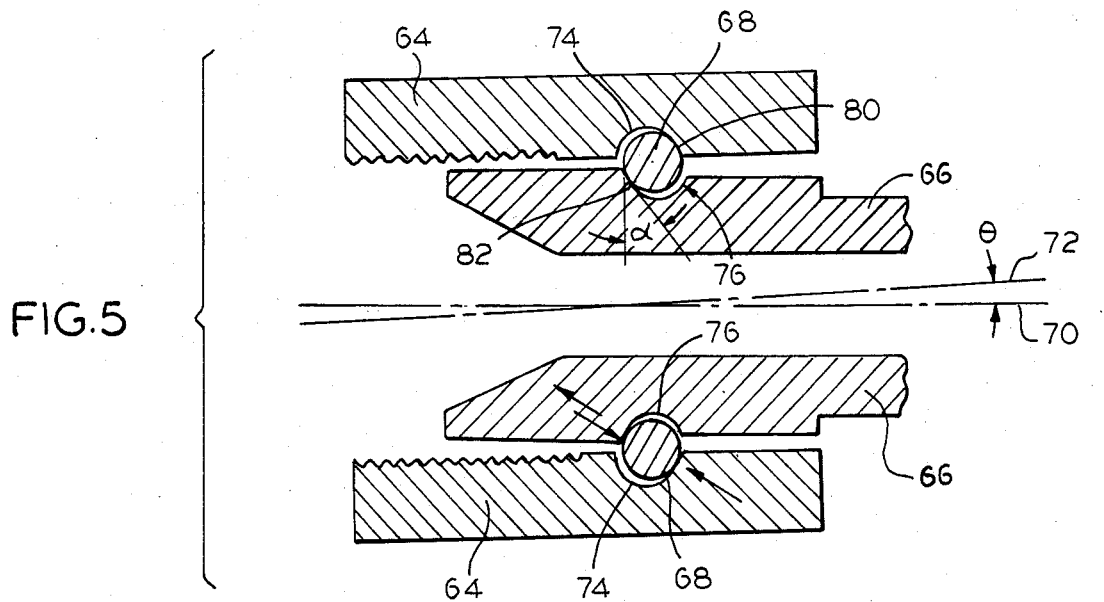
FIG. 5 shows the inventive pin wired nut which is used on the lip seal fitting.

As shown in the invention (FIG. 5), a misalignment causes the center axis 70 of the ferrule to be set at an angle of $\theta$ with respect to the center axis 72 of the nut 64. The angle $\theta$ is great enough so that the parallel nut-to-pinwire-to-ferrule forces of the prior art device (FIG. 4) will no longer work.

According to the invention, the problem of misalignment is solved by changing the center line of the conventional U-shaped cross-section of grooves or slots 60, 62 from being perpendicular to center line 70 to a skewed position which results in a tapered wall configuration of slots 74, 76. Thus, the pin ring 68 is able to ride up or down the tapered wall depending upon the misalignment of the nut 64 relative to the ferrule 66. This change of the load side of the U-slots from straight (right angle to axis of FIG. 4) to a skew or taper (less than right angle to axis of FIG. 5) enables the pin wire to ride up and down the taper and allows the nut axis to change its alignment relative to the ferrule axis (see FIG. 5). This ability of the pin wire 68 to seat itself in different positions allows the ferrule to align itself with respect to the nut as it adjusts its axis to pick up the mating threads and compensate for misalignment of the parts. If the prior art U-slots with straight sides are used, the pin wire 68 cannot change its angle relative to the axis of the ferrule and the self alignment is inhibited.

The more the bearing side walls 80, 82 of the U-slot move off the vertical, the easier it is for the pin wire 68 to shift it position relative to the axis of the ferrule 66 and to compensate for misalignment. Unfortunately, that same shift also increases the "offset" load that tends to jam the nut 64 and pinwire 68 when the nut is torqued. The angles $\alpha$ are the same on both the nut 64 and the ferrule 66. If the angle between vertical and the U-slot bearing surface is "$\alpha$", then the offset load (O.L.) is a function of the torque load (TL) and of the sine of $\alpha$ (i.e. O.L.=TL sin $\alpha$). The sealing load (SL) is a function of torque load and cos $\alpha$ (i.e. SL=TL cos $\alpha$). Therefore, when $\alpha$=0 the O.L.=0 and SL=TL; there is no offset component to help shift the pin wire 68 for alignment purposes.

Similarly, when $\alpha$=15 degrees the O.L.=0.26TL and SL=0.97TL. In this case, there is a force which is adequate to shift the position of the pin wire 68 and still provide a good lateral component to overcome the offset jamming force and thus to insure a good seal.

When $\alpha$=45 degrees the O.L.=0.707TL and the SL=0.707TL. At this point the jamming component matches the sealing component. The ability to seal then depends upon the friction and galling characteristics of the materials involved.

The tapers of the bearing side walls 80, 82 and the taper angles $\alpha$ are taken relative to a perpendicular of the center line 70 of the nut 64 and ferrule 66, when they are perfectly aligned. They may vary between the limits of 6-degrees and 45-degrees. If the angle is less than 6-degrees, the tapered sides 80, 82 become so steep that the pin wire 68 movement almost becomes impossible, assuming that a reasonable cross-sectional diameter is used for the wire ring. Therefore, the amount of misalignment which can be corrected becomes so small that there is insufficient practical benefit. At the 45-degree angle, the "offset" of the torque load and the sealing "load" forces become equal, which is the practical limit of reliable and consistent sealing. If the angle $\alpha$ becomes greater than 45-degrees, the seal becomes inconsistent and the fitting cannot be depended upon to never fail under adverse conditions.

Experimentation and testing indicates that an angle $\alpha$ of approximately 15-degrees is preferred because it produces a practical compromise between the sealing component and the offset component of the torque load.

Those who are skilled in the art will readily perceive how to modify the system. Therefore, the appended claims are to be construed to cover all equivalent structures which fall within the true scope and spirit of the invention.

What is claimed:

1. A self-aligning tube fitting comprising: a nut having an axial bore formed therein; a ferrule passing through said bore; a pair of confronting annular slots having side walls formed in said nut and ferrule; and an annular pin wire ring with a circular cross-section positioned in and bridging said confronting slots to act as a bearing surface for receiving thrusts exerted by the opposing side walls of said confronting slots despite minor axial misalignment between the nut and the ferrule, the cross-section of said confronting slots being non-circular and having said side walls skewed relative to lines perpendicular to center axes of said nut and said ferrule whereby the side walls of said slot are tapered in order to cause said pin wire ring to ride up and down the tapered wall in response to opposing thrust forces exerted upon said pin wire ring as said nut is turned to tighten and loosen it, when said ferrule is misaligned.

2. The fitting of claim 1 wherein said ferrule includes a lip seal having a pair of concentric sealing rings with a Belleville spring arched between said sealing rings.

3. The fitting of claim 2 wherein a perpendicular to said axial bore and said tapered side walls of said slot make an angle in the range of 6-degrees to 45-degrees.

4. The fitting of claim 2 wherein a perpendicular to said axial bore and said tapered side wall make an angle of 15-degrees.

5. The fitting of claim 1 wherein a perpendicular to said axial bore and said tapered side walls of said slot make an angle in the range of 6-degrees to 45-degrees.

6. The fitting of claim 1 wherein a perpendicular to said axial bore and said tapered side wall make an angle of 15-degrees.

7. A four-part self-aligning fitting comprising a first part in the form of a threaded nut with a skewed annular U-shaped slot forming a first half of a joint, a second part in the form of a ferrule with an annular sealing flange which is arched in cross-section, a second skewed annular U-shaped slot formed in said ferrule to provide a second half of a joint which cooperates with said annular slot in said nut to form a complete joint for responding to axial forces to press said flange into a sealing contact as said nut is tightened, said slots being located a distance away from said arched flange, each of said slots forming a bearing angle which is in the approximate range of 6-degrees to 45-degrees with respect to a line perpendicular to the axis of said nut so that the ferrule and the nut may be substantially misaligned and still present confronting slots, a third part in the form of an annular pin ring with a circular cross-section for forming a bearing surface between said skewed annular slots in said nut and ferrule, said pin ring fitting into and being captured by and between said slots regardless of axial misalignment of nut and ferrule, said pin ring bridging a space between said nut and said ferrule, a fourth part comprising a threaded nipple having an annular tapered flat surface at its end, said threaded nut being tightened onto said threaded nipple to bring said annular sealing flange into contact with said tapered flat surface, and an axial fluid passageway extending through said four parts, gas pressure in said passageway pressing said annular sealing flange into a tighter gas sealing engagement with said tapered flat surface.

8. The flanged seal of claim 7 wherein said ferrule and annular sealing flange are interconnected by a neck region, said flange being attached to one end of said neck and said slot being formed on the opposite end of said neck.

9. The fitting of claim 1 and a threaded nipple for receiving said nut, said nipple and said ferrule including complementary faces for making a metal-to-metal seal between said ferrule and said nipple, the tightening of said nut on said threaded nipple pressing said complementary faces into a tight and sealing metal-to-metal contact.

10. A four-part self-aligning fitting comprising a first part in the form of a threaded nut with a skewed annular U-shaped slot forming a first half of a joint, a second part in the form of a ferrule with an annular sealing face, a second skewed annular U-shaped slot formed in said ferrule to provide a second half of a joint which cooperates with said annular slot in said nut to form a complete joint for responding to axial forces to press said face into a sealing contact as said nut is tightened, said skewed slots being located a distance away from said face, each of said slots forming a bearing angle which is in the approximate range of 6-degrees to 45-degrees with respect to a line perpendicular to the axis of said nut so that the ferrule and the nut may be substantially misaligned and still present confronting slots, a third part in the form of an annular pin ring with circular cross-section for forming a bearing surface between said annular slots in said nut and ferrule, said pin ring fitting into and being captured by and between said slots regardless of axial misalignment of nut and ferrule, a fourth part comprising a threaded nipple having an annular face surface at its end, said threaded nut being tightened onto said threaded nipple to bring said annular sealing faces into contact with each other, and an axial fluid passageway extending through said four parts.

* * * * *